United States Patent [19]

Prassas

[11] Patent Number: 4,757,034
[45] Date of Patent: Jul. 12, 1988

[54] LIGHTLY TINTED GLASSES OF VARIABLE TRANSMISSION

[75] Inventor: Michel Prassas, Avon, France

[73] Assignee: Corning Glass Works, Corning, N.Y.

[21] Appl. No.: 31,267

[22] Filed: Mar. 30, 1987

[30] Foreign Application Priority Data

Jul. 11, 1986 [FR] France ................................ 86 10165

[51] Int. Cl.$^4$ .......................... C03C 4/06; C03C 3/11
[52] U.S. Cl. ........................................ 501/13; 501/56
[58] Field of Search ........................................... 501/13

[56] References Cited

U.S. PATENT DOCUMENTS

| | | | |
|---|---|---|---|
| 3,998,647 | 12/1976 | Yamashita et al. | 501/13 |
| 4,102,693 | 7/1978 | Owen et al. | 501/13 |
| 4,130,437 | 12/1978 | Mazean et al. | 501/13 |
| 4,251,278 | 2/1981 | Hares | 501/13 |
| 4,549,894 | 10/1985 | Aranjo et al. | 501/13 |

*Primary Examiner*—Mark L. Bell
*Attorney, Agent, or Firm*—Clinton S. Janes, Jr.

[57] ABSTRACT

This invention relates to the production of lightly tinted, photochromic glasses having base compositions consisting essentially, in weight percent, of

| | | | |
|---|---|---|---|
| $SiO_2$ | 46–60 | SrO | 0–6 |
| $B_2O_3$ | 16–28 | BaO | 0–6 |
| $Al_2O_3$ | 4–11 | $P_2O_5$ | 0–5 |
| $ZrO_2$ | 2–6 | $TiO_2$ | 0–3 |
| $Li_2O$ | 1.5–5 | Ag | 0.08–0.18 |
| $Na_2O$ | 0–6 | Cl | 0.06–0.26 |
| $K_2O$ | 2.5–9 | Br | 0.08–0.18 |
| MgO | 0–3.5 | CuO | 0.0001–0.0020 |
| CaO | 0–6 | | |

Glass color can be adjusted by introducing in excess of the above base composition, at least one of the following colorants in the indicated proportions of

| | | | |
|---|---|---|---|
| Pd | 0.00003–0.00015 | $Er_2O_3$ | 0.2–1.3 |
| $SnO_2$ | 0.05–0.3 | $Nd_2O_3$ | 0–0.7 |
| $Fe_2O_3$ | 0.05–0.15 | $Co_3O_4$ | 0–0.0080 |
| NiO | 0.005–0.015 | | |

4 Claims, No Drawings

LIGHTLY TINTED GLASSES OF VARIABLE TRANSMISSION

BACKGROUND OF THE INVENTION

This invention relates to the preparation of lightly tinted glasses of variable transmission which lend themselves for ophthalmic lens applications.

In the present context, it is understood that glasses "lightly tinted of variable transmission" are glasses exhibiting a light tint (for example, gray, gray-brown, brown, pink) and having a luminous transmission which changes very rapidly and in a reversible manner as a function of the exposure of the glass to a source of actinic radiation, but relatively little when compared to conventional photochromic glasses since their luminous transmission before exposure is located within the range of 60–80%.

The majority of patents concerning photochromic glasses describe compositions permitting products for ophthalmic applications to be obtained which are capable of achieving, through darkening, a range of transmission between 10–40% at ambient temperature (20°–25° C.).

The progress realized permits us today to satisfy the needs, with respect to solar protection, of many wearers of ophthalmic lenses. In fact, the presence in the marketplace of photochromic glasses, distinct products capable of covering the levels of darkening between 10–60%, gives to the users a freedom of choice adapted to their specific needs.

There exists, however, a large category of ophthalmic lens wearers, namely, wearers of glasses wherein the transmission does not vary, designated "fixed tints." These people do not want glasses exhibiting a luminous transmission below about 60% and, preferably, not below about 70% ("fixed tints" A and A-B).

SUMMARY OF THE INVENTION

The goal of this invention is to form lightly tinted glasses—preferably with tints that are generally desired by this category of wearers—having a variable transmission complying with the criteria stated previously. The major advantage is that the glass in darkening outside under the effect of actinic radiation offers to the wearer the equivalent of a "tinted" glass or fixed transmission, whereas when inside, that is to say, removed from the actinic radiation, it exhibits very little absorption. Furthermore, the optional addition of at least one additional colorant during the manufacture of the glass permits light and pleasing tints to be obtained, thereby offering aesthetic comfort to the wearer. To our knowledge this is the first time that such a lens will be proposed for eyeglass wearers.

More precisely, the invention concerns a lightly tinted glass of variable transmission whose base composition consists essentially, reported in terms of weight percent on the oxide basis, of

| SiO$_2$ | 46–60 | MgO | 0–3.5 |
| --- | --- | --- | --- |
| B$_2$O$_3$ | 16–28 | CaO | 0–6 |
| Al$_2$O$_3$ | 4–11 | SrO | 0–6 |
| ZrO$_2$ | 2–6 | BaO | 0–6 |
| Li$_2$O | 1.5–5 | P$_2$O$_5$ | 0–5 |
| Na$_2$O | 0–6 | TiO$_2$ | 0–3 |
| K$_2$O | 2.5–9 | | |

Also present are small quantities of Ag, Cl, Br, and CuO, termed photochromic elements, characterized in that (A) the said photochromic elements are present in the following proportions, given in weight percent as analyzed in the glass

| Ag | 0.08–0.18 | Br | 0.08–0.18 |
| --- | --- | --- | --- |
| Cl | 0.06–0.26 | CuO | 0.0001–0.0020 | with the conditions that;

(i) when the amount of Ag is greater or equal to 0.12%, the ratio Br:(Cl+Br)≧0.25; and (ii) when the amount of Ag is less than 0.12%, the ratio Br:(Cl+Br)≧0.30; and (b) the glass, when in the form of a lens of 2 mm thickness, exhibits the following optical properties:

(a) a luminous transmission in the clear state ($T_o$) greater than about 86%;

(b) a luminous transmission in the darkened state of about 60–80% after an exposure of 15 minutes to actinic radiation ($T_{D15}$) over the full extent of temperatures within the range of 0°–25° C.;

(c) a fading rate at ambient temperature (20°–25° C.) such that, five minutes after removal from actinic radiation, the glass exhibits a luminous transmission ($T_{F5}$) of at least 78%;

(d) a difference of luminous transmission in the darkened state over the temperature interval of 0°–25° C. of less than 5 percentage points of transmission; and (e) a difference of luminous transmission in the darkened state over the temperature interval of 25°–40° C. of less than 6 percentage points of transmission.

The last two parameters (d) and (e) reflect very low thermal dependence of the glasses according to the invention and describe in relation with parameters (a), (b), and (c) the optical characteristics of the lens over the full extent of temperatures within the range of 0°–40° C.

In accordance with a preferred mode of carrying out the invention, the composition of the base glass consists essentially, reported in terms of weight percent of the oxide basis, of

| SiO$_2$ | 50–60 | MgO | 0–1 |
| --- | --- | --- | --- |
| B$_2$O$_3$ | 16–25 | CaO | 0–4 |
| Al$_2$O$_3$ | 5–8 | SrO | 0–4 |
| ZrO$_2$ | 2–6 | BaO | 0–4 |
| Li$_2$O | 1.5–4.5 | P$_2$O$_5$ | 0–3.5 |
| Na$_2$O | 0.4–4.5 | TiO$_2$ | 0–2.5 |
| K$_2$O | 4–8 | | |

The photochromic elements are present in the following proportions, given in weight percent as analyzed in the glass:

| Ag | 0.09–0.15 | Br | 0.010–0.15 |
| --- | --- | --- | --- |
| Cl | 0.10–0.22 | CuO | 0.0001–0.0010 | the ratio Br:(Cl+Br)≧0.30 when the amount of Ag≧0.12%, and the ratio Br:(Cl+Br)≧0.40 when the amount of Ag<0.12%; and the glass, when it is in the form of lens of 2 mm thickness, exhibits the following optical properties;

(a) a luminous transmission in the clear state ($T_o$) greater than about 86%;

(b) a luminous transmission in the darkened state after an exposure of 15 minutes to actinic radiation ($T_{D15}$) over the full extent of temperatures within the range of 0°–25° C. of about 70–77%;

(c) a fading rate at ambient temperature (20°–25° C.) such that, five minutes after removal from actinic radiation, the glass exhibits a luminous transmission ($T_{F5}$) of at least 83%;

(d) a difference of luminous transmission in the darkened state over the temperature intervals of 0°–25° C. of less than three percentage points of transmission; and (e) a difference of luminous transmission in the darkened state over the temperature interval of 25°–40° C. of less than four percentage points of transmission.

The range limits prescribed above for the constituents of the base glass compositions are equally critical in order to obtain glasses exhibiting good melting and forming, and possessing chemical and physical properties (for example, strengthening through chemical and/or physical tempering, good durability, refractive index) required of glasses used in optical and ophthalmic applications as well as the required photochromic behavior.

The glasses of low darkening ($T_{D15} \geq 60\%$) can be made according to the present invention through the introduction in the base glass of the constituents Ag, Cl, Br, and CuO at relatively low levels. The amount of CuO should be particularly controlled in order to obtain the transmission properties and especially a very low thermal dependence and rapid return to the clear state. Such small levels of Ag, Cl, and Br as those prescribed for the invention can lead to the development of an "opalescence" detrimental to the use of the glass. In order to avoid this, it is necessary that the relations concerning the ratio Br:(Cl+Br) mentioned above be satisfied.

In general, the more the level of Ag in the glass is low, the more the ratio Br:(Cl+Br) should be raised.

The color of the glasses defined above in the darkened state is a neutral gray or gray-brown.

However, the color can be modified by incorporating in the vitrifiable batch one or several of the following colorants in the indicated proportions which are given in weight percent in excess of the glass composition:

| Pd | 0.00003–0.00015 | $Er_2O_3$ | 0.2–1.3 |
|---|---|---|---|
| $SnO_2$ | 0.05–0.3 | $Nd_2O_3$ | 0–0.7 |
| $Fe_2O_3$ | 0.05–0.15 | $Co_3O_4$ | 0–0.0080 |
| NiO | 0.005–0.015 | | |

The obtaining of a brown tint in the darkened state similar to the brown fixed tints present in the marketplace and for the same transmission range requires the introduction into the glass of Pd or $SnO_2$ or $Fe_2O_3$ or NiO. Pd is the constituent which is preferably used. The minimum content in the glass should be $\geq 0.00003\%$ in order to obtain the desired tint, but $\geq 0.00015\%$ in order to avoid a yellow coloration of the glass in the clear state.

$SnO_2$ or $Fe_2O_3$ or NiO added to the glass composition in the above proportions could be used for the same purpose as Pd in order to obtain a brown tint in the darkened state. These colors, however, confer to the glass in the clear state a much more pronounced yellow tint than Pd and, therefore, are not preferred.

The obtaining of a pink tint can be achieved through the introduction of $Er_2O_3$ into the base glass composition. The minimum content in this case will be 0.2%. In order to avoid a significant reduction in luminous transmission in the clear state, its maximum content should not go beyond 1.3%.

In order to obtain different tints in the darkened state, going from brown to pink, one preferably uses combinations of Pd and $Er_2O_3$.

The adjustment of the color in the clear state can be realized through additions of $Nd_2O_3$ and $Co_3O_4$. Furthermore, these two oxides could be used by themselves in cases where a gray or gray-blue color is desired.

DESCRIPTION OF PREFERRED EMBODIMENTS

Table I below presents glass compositions, expressed in parts by weight on the oxide basis, which illustrate the glasses of the invention. Because the total of the individual constituents—with the exception of the constituents used to tint the glass—are equal or very close to 100, the indicated values can be considered, for all practical purposes, as representing weight percentages. The colorant constituents Pd, $Er_2O_3$, $Nd_2O_3$, NiO, $SnO_2$, $Fe_2O_3$, and $Co_3O_4$ are expressed in excess of 100%.

The ingredients of the vitrifiable batch can include any materials, either oxides or other compounds, such that, when they are melted together, they are found to be converted into the desired oxide in the proper proportions. The halogens Cl and Br will generally be added in the form of halides of alkali metals. The compounds used to tint the glass will generally be added in the form of oxides or related metal salts.

The ingredients of the vitrifiable batch are combined, carefully mixed in a ball mill to promote the obtaining of a homogeneous mass, and then progressively transferred to a platinum crucible heated by the Joule effect. The vitrifiable batch is melted for three hours at about 1400° C. After molding, the glass is annealed at about 450° C.

The glass samples noted in Table I were introduced into an electrically heated furnace and exposed to the times in minutes and to the temperatures in °C. indicated in Table II. The samples were thereafter removed from the furnace and then ground and polished to a thickness of about 2 mm. Generally, temperatures ranging between 600°–675° C. have proven satisfactory for obtaining the desired optical properties.

Table II also indicates measurements of photochromic behavior as well as the color of the glasses.

The color of the glass is defined by the trichromatic coordinates (x,y) determined by the trichromatic colorimetric system of the C.I.E. of 1931 utilizing Illuminant C as the luminous source. This colorimetric system and this luminous source are explained by A. C. Hardy in the *Handbook of Colorimetry*, Technology Press, M.I.T., Cambridge, Mass., U.S.A. (1936).

The color in the darkened state ($x_{20},y_{20}$) is determined after an exposure of 20 minutes at 25° C. under a source of ultraviolet lumination (B.L.B. "Black-Light-Blue" lamp). The corresponding luminous transmission is indicated by $T_{D20}$.

The luminous transmissions simulating the behavior of the glasses to the action of actinic radiation similar to solar radiation can be measured with the aid of a solar simulator apparatus whose principle is described in U.S. Pat. No. 4,190,451.

In Table II:

$T_o$ designates the luminous transmission of the glass in the clear state (undarkened);

$T_{D15}$ (25° C.) designates the luminous transmission of the glass in the darkened state after an exposure of 15 minutes to the actinic radiation solar simulator source at 25° C.;

$T_{F5}$ (25° C.) designates the luminous transmission of the glass after five minutes' fading after removal from the actinic radiation solar simulator source at 25° C.;

$DT_{15}$ (0°–25° C.) designates the difference in luminous transmission in the darkened state of the glass over the temperature range of 0°–25° C.; and $DT_{15}$ (25°–40° C.) designates the difference in luminous transmission in the darkened state over the temperature range of 25°–40° C.

Examples 1 ∝ 10 are representative of glasses exhibiting low darkening containing variable amounts of Ag, Br, Cl, CuO, and without additional colorants. The color in the darkened state is a neutral gray or gray-brown. It should be noted that the amount of CuO in Example 9 exceeds that prescribed, and, by this fact, the glass is outside the desired transmission range and, therefore, is outside the invention.

Examples 1 and 2 illustrate the effect of thermal treatment upon the performance of the glass. Examples 11–39 illustrate the effect of various colorants upon the color in the clear state and in the darkened state of the glasses. Examples 11–19 are representative of glasses with one colorant showing a brown tint in the darkened state. Lowering the luminous transmission in the clear state caused by a higher content of $SnO_2$ is shown by Example 15, which is outside of the invention.

Examples 20–25 illustrate the effect of $Er_2O_3$, $Nd_2O_3$, and $Co_3O_4$ upon the color of the glasses in the clear state and in the darkened state. Example 26 shows the effect of $Co_3O_4$ upon the luminous transmission in the clear state when it is introduced into the glass in amounts going beyond what are prescribed. This example is outside of the invention.

The introduction of one of the above-mentioned colorants induces a color in the clear state of the glass which can be adjusted, if necessary, through the introduction of a second, even a third colorant. A careful proportioning of a combination of colorants introduced into the glass permits the development of similar pleasing tints to the existing fixed tints for the same transmission range. The nature of the colorants as well as their respective amounts are functions of the shade which one desires to give to the color in the clear state and in the darkened state of the glass.

Examples 27–39 illustrate the effect such combinations have upon the color. Examples 27–34 are representative of brown glasses and those of 35–39 of pink glasses.

Example 6, Examples 29, 32, 34, and Examples 35, 37, 38 are illustrative of the preferred forms of producing grey, brown, and pink tints, respectively.

TABLE I

| | 1 | 2 | 3 | 4 | 5 | 6 | 7 | 8 | 9* | 10 | 11 | 12 |
|---|---|---|---|---|---|---|---|---|---|---|---|---|
| $SiO_2$ | 54.5 | 54.5 | 54.5 | 54.5 | 54.5 | 54.5 | 54.5 | 56.4 | 56.4 | 54.5 | 56.4 | 56.4 |
| $B_2O_3$ | 20.2 | 20.2 | 20.2 | 20.2 | 20.2 | 20.2 | 20.2 | 18.75 | 18.75 | 20.2 | 18.75 | 18.75 |
| $Al_2O_3$ | 8.54 | 8.54 | 8.54 | 8.54 | 8.54 | 8.54 | 8.54 | 8.45 | 8.45 | 8.54 | 8.45 | 8.45 |
| $ZrO_2$ | 2.58 | 2.58 | 2.58 | 2.58 | 2.58 | 2.58 | 2.58 | 2.55 | 2.55 | 2.58 | 2.55 | 2.55 |
| $Li_2O$ | 2.81 | 2.81 | 2.81 | 2.81 | 2.81 | 2.81 | 2.81 | 2.78 | 2.78 | 2.81 | 2.78 | 2.78 |
| $Na_2O$ | 1.5 | 1.5 | 1.5 | 1.5 | 1.5 | 1.5 | 1.5 | 1.28 | 1.28 | 1.5 | 1.28 | 1.28 |
| $K_2O$ | 4.93 | 4.93 | 4.93 | 4.93 | 4.93 | 4.93 | 4.93 | 4.9 | 4.9 | 4.93 | 4.9 | 4.9 |
| CaO | 2.94 | 2.94 | 2.94 | 2.94 | 2.94 | 2.94 | 2.94 | 2.9 | 2.9 | 2.94 | 2.9 | 2.9 |
| $TiO_2$ | 2.0 | 2.0 | 2.0 | 2.0 | 2.0 | 2.0 | 2.0 | 1.99 | 1.99 | 2.0 | 1.99 | 1.99 |
| Ag | 0.13 | 0.13 | 0.17 | 0.12 | 0.12 | 0.11 | 0.11 | 0.136 | 0.136 | 0.12 | 0.14 | 0.14 |
| Cl | 0.26 | 0.26 | 0.23 | 0.19 | 0.12 | 0.17 | 0.07 | 0.208 | 0.208 | 0.07 | 0.21 | 0.21 |
| Br | 0.109 | 0.109 | 0.105 | 0.142 | 0.146 | 0.140 | 0.142 | 0.118 | 0.118 | 0.148 | 0.11 | 0.11 |
| CuO | 0.0010 | 0.0010 | 0.0010 | 0.0010 | 0.0005 | 0.0005 | 0.0008 | 0.001 | 0.0022 | 0.0005 | 0.001 | 0.001 |
| Pd | | | | | | | | | | | 0.0004 | 0.00015 |
| $SnO_2$ | | | | | | | | | | | — | — |

| | 13 | 14 | 15* | 16 | 17 | 18 | 19 | 20 | 21 | 22 | 23 | 24 | 25 | 26* |
|---|---|---|---|---|---|---|---|---|---|---|---|---|---|---|
| $SiO_2$ | 56.4 | 56.4 | 56.4 | 56.4 | 56.4 | 56.4 | 56.4 | 56.4 | 56.4 | 56.4 | 56.4 | 56.4 | 56.4 | 56.4 |
| $B_2O_3$ | 18.75 | 18.75 | 18.75 | 18.75 | 18.75 | 18.75 | 18.75 | 18.75 | 18.75 | 18.75 | 18.75 | 18.75 | 18.75 | 18.75 |
| $Al_2O_3$ | 8.45 | 8.45 | 8.45 | 8.45 | 8.45 | 8.45 | 8.45 | 8.45 | 8.45 | 8.45 | 8.45 | 8.45 | 8.45 | 8.45 |
| $ZrO_2$ | 2.55 | 2.55 | 2.55 | 2.55 | 2.55 | 2.55 | 2.55 | 2.55 | 2.55 | 2.55 | 2.55 | 2.55 | 2.55 | 2.55 |
| $Li_2O$ | 2.78 | 2.78 | 2.78 | 2.78 | 2.78 | 2.78 | 2.78 | 2.78 | 2.78 | 2.78 | 2.78 | 2.78 | 2.78 | 2.78 |
| $Na_2O$ | 1.28 | 1.28 | 1.28 | 1.28 | 1.28 | 1.28 | 1.28 | 1.28 | 1.28 | 1.28 | 1.28 | 1.28 | 1.28 | 1.28 |
| $K_2O$ | 4.9 | 4.9 | 4.9 | 4.9 | 4.9 | 4.9 | 4.9 | 4.9 | 4.9 | 4.9 | 4.9 | 4.9 | 4.9 | 4.9 |
| CaO | 2.9 | 2.9 | 2.9 | 2.9 | 2.9 | 2.9 | 2.9 | 2.9 | 2.9 | 2.9 | 2.9 | 2.9 | 2.9 | 2.9 |
| $TiO_2$ | 1.99 | 1.99 | 1.99 | 1.99 | 1.99 | 1.99 | 1.99 | 1.99 | 1.99 | 1.99 | 1.99 | 1.99 | 1.99 | 1.99 |
| Ag | 0.14 | 0.14 | 0.14 | 0.14 | 0.14 | 0.14 | 0.14 | 0.14 | 0.14 | 0.14 | 0.14 | 0.14 | 0.14 | 0.14 |
| Cl | 0.21 | 0.21 | 0.21 | 0.21 | 0.21 | 0.21 | 0.21 | 0.21 | 0.21 | 0.21 | 0.21 | 0.21 | 0.21 | 0.21 |
| Br | 0.11 | 0.11 | 0.11 | 0.11 | 0.11 | 0.11 | 0.11 | 0.11 | 0.11 | 0.11 | 0.11 | 0.11 | 0.11 | 0.11 |
| CuO | 0.001 | 0.001 | 0.001 | 0.001 | 0.001 | 0.001 | 0.001 | 0.001 | 0.001 | 0.001 | 0.001 | 0.001 | 0.001 | 0.001 |
| Pd | 0.00015 | — | — | | | | | | | | | | | — |
| $SnO_2$ | — | 0.1 | 0.6 | | | | | | | | | | | |
| $Fe_2O_3$ | | | | 0.1 | 0.2 | — | — | — | | | | | | |
| NiO | | | | — | — | 0.01 | 0.015 | — | | | | | | |
| $Er_2O_3$ | | | | — | — | — | — | 0.1 | 0.6 | — | — | — | — | — |
| $Nd_2O_3$ | | | | | | | | | — | 0.1 | 0.4 | — | — | |
| $Co_3O_4$ | | | | | | | | | — | — | — | 0.001 | 0.005 | 0.015 |

| | 27 | 28 | 29 | 30 | 31 | 32 | 33 | 34 | 35 | 36 | 37 | 38 | 39 |
|---|---|---|---|---|---|---|---|---|---|---|---|---|---|
| $SiO_2$ | 56.4 | 56.4 | 56.4 | 56.4 | 54.5 | 54.5 | 54.5 | 54.5 | 56.4 | 56.4 | 56.4 | 56.4 | 56.4 |
| $B_2O_3$ | 18.75 | 18.75 | 18.75 | 18.75 | 20.2 | 20.2 | 20.2 | 20.2 | 18.75 | 18.75 | 18.75 | 18.75 | 18.75 |
| $Al_2O_3$ | 8.45 | 8.45 | 8.45 | 8.45 | 8.54 | 8.54 | 8.54 | 8.54 | 8.45 | 8.45 | 8.45 | 8.45 | 8.45 |
| $ZrO_2$ | 2.55 | 2.55 | 2.55 | 2.55 | 2.58 | 2.58 | 2.58 | 2.58 | 2.55 | 2.55 | 2.55 | 2.55 | 2.55 |
| $Li_2O$ | 2.78 | 2.78 | 2.78 | 2.78 | 2.81 | 2.81 | 2.81 | 2.81 | 2.78 | 2.78 | 2.78 | 2.78 | 2.78 |
| $Na_2O$ | 1.28 | 1.28 | 1.28 | 1.28 | 1.5 | 1.5 | 1.5 | 1.5 | 1.28 | 1.28 | 1.28 | 1.28 | 1.28 |

TABLE I-continued

| | | | | | | | | | | | | | |
|---|---|---|---|---|---|---|---|---|---|---|---|---|---|
| K₂O | 4.9 | 4.9 | 4.9 | 4.9 | 4.93 | 4.93 | 4.93 | 4.93 | 4.9 | 4.9 | 4.9 | 4.9 | 4.9 |
| CaO | 2.9 | 2.9 | 2.9 | 2.9 | 2.94 | 2.94 | 2.94 | 2.94 | 2.9 | 2.9 | 2.9 | 2.9 | 2.9 |
| TiO₂ | 1.99 | 1.99 | 1.99 | 1.99 | 2.0 | 2.0 | 2.0 | 2.0 | 1.99 | 1.99 | 1.99 | 1.99 | 1.99 |
| Ag | 0.14 | 0.14 | 0.14 | 0.14 | 0.10 | 0.12 | 0.12 | 0.123 | 0.14 | 0.14 | 0.14 | 0.14 | 0.14 |
| Cl | 0.21 | 0.21 | 0.21 | 0.21 | 0.16 | 0.17 | 0.17 | 0.162 | 0.21 | 0.21 | 0.21 | 0.21 | 0.21 |
| Br | 0.11 | 0.11 | 0.11 | 0.11 | 0.129 | 0.136 | 0.136 | 0.137 | 0.11 | 0.11 | 0.11 | 0.11 | 0.11 |
| CuO | 0.001 | 0.001 | 0.001 | 0.001 | 0.0006 | 0.0006 | 0.0006 | 0.0006 | 0.001 | 0.001 | 0.001 | 0.001 | 0.001 |
| Co₃O₄ | — | 0.003 | 0.003 | — | 0.003 | 0.003 | 0.003 | 0.003 | — | | | | |
| Pd | 0.00015 | 0.00004 | 0.00004 | 0.0001 | 0.00004 | 0.00004 | 0.00006 | 0.00005 | — | — | — | 0.00008 | 0.00008 |
| Er₂O₃ | 0.35 | — | 0.5 | 0.35 | 0.5 | 0.35 | 0.35 | 0.25 | 1.0 | 1.0 | 0.8 | 0.8 | 0.8 |
| Nd₂O₃ | | | | | — | — | — | — | 0.1 | 0.1 | 0.1 | — | — |

*Outside of the invention.

Table II records the heat treatment applied to each sample to induce photochromic behavior expressed in terms of °C. and times in minutes. $x_o$ and $y_o$ represent the trichromatic coordinates (x,y) in the clear state, and $x_{20}$ and $y_{20}$ represent the trichromatic coordinates (x,y) after 20 minutes' exposure to the "Black-light-Blue" lamp.

TABLE II

| | 1 | 2 | 3 | 4 | 5 | 6 | 7 | 8 | 9 | 10 | 11 | 12 | 13 |
|---|---|---|---|---|---|---|---|---|---|---|---|---|---|
| Treatment | 650-15 | 620-20 | 650-15 | 650-15 | 650-15 | 650-15 | 650-15 | 650-15 | 650-15 | 650-15 | 650-15 | 650-15 | 620-20 |
| $T_o$ | 91.2 | 91.7 | 91.3 | 91.2 | 91.4 | 91.4 | 91.3 | 91.5 | 91.6 | 91.5 | 90.9 | 89.4 | 90.4 |
| $x_o$ | 0.3127 | 0.3113 | 0.3127 | 0.3126 | 0.3121 | 0.3121 | 0.3120 | 0.3123 | 0.3122 | 0.3119 | 0.3129 | 0.3141 | 0.3140 |
| $y_o$ | 0.3217 | 0.3195 | 0.3219 | 0.3217 | 0.3210 | 0.3210 | 0.3208 | 0.3217 | 0.3216 | 0.3209 | 0.3224 | 0.3238 | 0.3225 |
| $T_{D20}$ | 68.6 | 77.5 | 68.7 | 69.9 | 77.9 | 77.3 | 75.7 | 68.5 | 56.1 | 79.4 | 67.4 | 71.7 | 78.3 |
| $x_{20}$ | 0.3177 | 0.319 | 0.3184 | 0.3163 | 0.3156 | 0.3156 | 0.3168 | 0.3182 | 0.3205 | 0.3155 | 0.3237 | 0.3214 | 0.3227 |
| $y_{20}$ | 0.3232 | 0.3236 | 0.3240 | 0.3227 | 0.3228 | 0.3228 | 0.3228 | 0.3238 | 0.3232 | 0.3229 | 0.3277 | 0.3283 | 0.3284 |
| $T_{D15}(25)$ | 68.5 | — | 68.7 | 67.6 | 78.4 | 77.5 | 75.6 | 68.9 | 53.6 | 79.5 | 67.8 | — | — |
| $T_{F5}(25)$ | 81.1 | — | 78.9 | 86.2 | 89.4 | 87.6 | 89.2 | 83.2 | 82.0 | 89.6 | 82.2 | — | — |
| $DT_{15}(0-25)$ | 0.4 | — | — | 2.8 | 0.9 | 0.3 | 2.1 | — | — | 0.9 | 1.8 | — | — |
| $DT_{15}(25-40)$ | 0.7 | — | 0.6 | 5.7 | 2.2 | 1.5 | 3.7 | 1.3 | 6.2 | 2.6 | 1.1 | — | — |

| | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Treatment | 650-15 | 650-15 | 650-15 | 650-15 | 650-15 | 650-15 | 650-15 | 650-15 | 650-15 | 650-15 | 650-15 | 650-15 | 650-15 | 650-15 |
| $T_o$ | 89.8 | 84.6 | 88.6 | 87.2 | 90.4 | 90.1 | 91.3 | 89.6 | 90.6 | 87.6 | 90.7 | 88.2 | 82.5 | 88.3 |
| $x_o$ | 0.3141 | 0.3177 | 0.3121 | 0.3199 | 0.3150 | 0.3160 | 0.3122 | 0.3145 | 0.3109 | 0.3080 | 0.3124 | 0.3101 | 0.3055 | 0.3159 |
| $y_o$ | 0.3234 | 0.3268 | 0.3208 | 0.3305 | 0.3245 | 0.3257 | 0.3210 | 0.3184 | 0.3205 | 0.3175 | 0.3212 | 0.3187 | 0.3128 | 0.3224 |
| $T_{D20}$ | 66.9 | 59.6 | 64.8 | 64.6 | 66.5 | 68.8 | 68.2 | 68.3 | 69.0 | 67.2 | 66.8 | 67.1 | 62.5 | 72.5 |
| $x_{20}$ | 0.3238 | 0.3318 | 0.3239 | 0.3282 | 0.3208 | 0.3221 | 0.3185 | 0.3204 | 0.3171 | 0.3145 | 0.3179 | 0.3169 | 0.3112 | 0.3212 |
| $y_{20}$ | 0.3277 | 0.3320 | 0.3274 | 0.3337 | 0.3263 | 0.3277 | 0.3229 | 0.3209 | 0.3225 | 0.3196 | 0.3229 | 0.3207 | 0.3151 | 0.3261 |
| $T_{D15}(25)$ | — | — | | | | | | | | | | | — | 73.5 |
| $T_{F5}(25)$ | — | — | | | | | | | | | | | — | 83.4 |
| $DT_{15}(0-25)$ | — | — | | | | | | | | | | | — | — |
| $DT_{15}(25-40)$ | — | — | | | | | | | | | | | — | 1.1 |

| | 28 | 29 | 30 | 31 | 32 | 33 | 34 | 35 | 36 | 37 | 38 | 39 |
|---|---|---|---|---|---|---|---|---|---|---|---|---|
| Treatment | 630-20 | 620-20 | 620-20 | 650-15 | 650-15 | 660-15 | 660-15 | 650-15 | 635-20 | 635-20 | 650-15 | 630-20 |
| $T_o$ | 89.6 | 88.2 | 90.1 | 87.4 | 87.7 | 87.5 | 88.0 | 88.2 | 88.5 | 88.9 | 86.1 | 88.8 |
| $x_o$ | 0.3109 | 0.3118 | 0.3137 | 0.3128 | 0.3126 | 0.3134 | 0.3127 | 0.3135 | 0.3127 | 0.3123 | 0.3165 | 0.3150 |
| $y_o$ | 0.3192 | 0.3168 | 0.3205 | 0.3177 | 0.3188 | 0.3192 | 0.3189 | 0.3161 | 0.3151 | 0.3158 | 0.3199 | 0.3183 |
| $T_{D20}$ | 70.2 | 74.7 | 77.2 | 73.8 | 74.6 | 74.9 | 75.5 | 67.6 | 73.3 | 68.1 | 69.7 | 73.2 |
| $x_{20}$ | 0.3203 | 0.3205 | 0.3228 | 0.3183 | 0.3180 | 0.3184 | 0.3176 | 0.3197 | 0.3203 | 0.3216 | 0.3244 | 0.3241 |
| $y_{20}$ | 0.3246 | 0.3228 | 0.3266 | 0.3212 | 0.3218 | 0.3229 | 0.3224 | 0.3184 | 0.3192 | 0.3200 | 0.3244 | 0.3242 |
| $T_{D15}(25)$ | — | — | 76.9 | 74.8 | — | 75.5 | 76.5 | 70.1 | 76.9 | — | 70.9 | 76.5 |
| $T_{F5}(25)$ | — | — | 85.6 | 85.5 | — | 86.7 | 86.7 | 81.1 | 87.1 | — | 81.6 | 85.8 |
| $DT_{15}(0-25)$ | — | — | — | 1.0 | — | — | — | 0.3 | — | — | 0.2 | — |
| $DT_{15}(25-40)$ | — | — | 2.2 | 2.3 | — | 2.8 | 2.4 | 1.4 | 4.9 | — | 1.1 | 3.0 |

I claim:

1. A lightly tinted, variable transmission glass having a base composition consisting essentially, reported in terms of weight percent on the oxide basis, of

| | | | |
|---|---|---|---|
| SiO₂ | 46-60 | MgO | 0-3.5 |
| B₂O₃ | 16-28 | CaO | 0-6 |
| Al₂O₃ | 4-11 | SrO | 0-6 |
| ZrO₂ | 2-6 | BaO | 0-6 |
| Li₂O | 1.5-5 | P₂O₅ | 0-5 |
| Na₂O | 0-6 | TiO₂ | 0-3 |
| K₂O | 2.5-9 | | | and also containing small amounts of the photochromic elements Ag, Cl, Br, and CuO, characterized in that
(A) the said photochromic elements are present in the following proportions, reported in terms of weight percent as analyzed in the glass

| | | | |
|---|---|---|---|
| Ag | 0.08-0.18 | Br | 0.08-0.18 |
| Cl | 0.06-0.26 | CuO | 0.0001-0.0020 | with the conditions that
(i) when the amount of Ag is greater or equal to 0.12%, the ratio Br:(Cl+Br) should be greater or equal to 0.25 and
(ii) when the amount of Ag is less than 0.12% the ratio Br:(Cl+Br) should be greater or equal to 0.30; and
(B) the glass, when it is in the form of a lens of 2 mm thickness, exhibits the following optical properties:
(a) a luminous transmission in the clear state ($T_o$) greater than about 86%;

(b) a luminous transmission in the darkened state after 15 minutes' exposure to actinic radiation ($T_{D15}$) over the full extent of temperatures of 0°–25° C. between about 60–80%;
(c) a fading rate at ambient temperature (20°–25° C.) such that, after five minutes' withdrawal from actinic radiation, the glass exhibits a luminous transmission ($T_{F5}$) of at least 78%;
(d) a difference of luminous transmission in the darkened state over the temperature interval of 0°–25° C. of less than five points of transmission percentage; and
(e) a difference of luminous transmission in the darkened state over the temperature interval of 25°–40° C. of less than six points of transmission percentage.

2. A glass according to claim 1 characterized in that the composition of the base glass, reported in weight percent as oxides, is as follows:

| | | | |
|---|---|---|---|
| $SiO_2$ | 50–60 | MgO | 0–1 |
| $B_2O_3$ | 16–25 | CaO | 0–4 |
| $Al_2O_3$ | 5–8 | SrO | 0–4 |
| $ZrO_2$ | 2–6 | BaO | 0–4 |
| $Li_2O$ | 1.5–4.5 | $P_2O_5$ | 0–3.5 |
| $Na_2O$ | 0.4–4.5 | $TiO_2$ | 0–2.5 |
| $K_2O$ | 4–8 | | | the photochromic elements are present in the following proportions, given in weight percent as analyzed in the glass:

| | | | |
|---|---|---|---|
| Ag | 0.09–0.15 | Br | 0.010–0.15 |
| Cl | 0.10–0.22 | CuO | 0.0001–0.0010 | the ratio Br:(Cl+Br) is greater or equal to 0.30 when the amount of Ag is greater or equal to 0.12%, and greater or equal to 0.40 when the amount of Ag is less than 0.12%
and the glass, when it is in the form of a 2 mm thick lens exhibits the following optical properties:

(a) a luminous transmission in the clear state ($T_o$) greater than about 86%;
(b) a luminous transmission in the darkened state after an exposure of 15 minutes to actinic radiation ($T_{D15}$) over the range of temperatures of 0°–25° C. between about 70–77%;
(c) a fading rate at ambient temperature (20°–25° C.) such that, after five minutes' withdrawal from actinic radiation, the glass exhibits a luminous transmission ($T_{F5}$) of at least 83%;
(d) a difference of luminous transmission in the darkened state over the temperature interval of 0°–25° C. of less than three points of transmission percentage; and
(e) a difference of luminous transmission in the darkened state over the temperature interval of 25°–40° C. of less than four points of transmission percentage.

3. A glass according to claim 1 characterized in that it also contains in its composition at least one of the following colorants in the indicated proportions which are given in weight percentages in excess of the glass composition:

| | | | |
|---|---|---|---|
| Pd | 0.00003–0.00015 | $Er_2O_3$ | 0.2–1.3 |
| $SnO_2$ | 0.05–0.3 | $Nd_2O_3$ | 0–0.7 |
| $Fe_2O_3$ | 0.05–0.15 | $Co_3O_4$ | 0–0.0080 |
| NiO | 0.005–0.015 | | |

4. A glass according to claim 2 characterized in that it also contains in its composition at least one of the following colorants in the indicated proportions which are given in weight percentages in excess of the base glass composition:

| | | | |
|---|---|---|---|
| Pd | 0.00003–0.00015 | $Er_2O_3$ | 0.2–1.3 |
| $SnO_2$ | 0.05–0.3 | $Nd_2O_3$ | 0–0.7 |
| $Fe_2O_3$ | 0.05–0.15 | $Co_3O_4$ | 0–0.0080 |
| NiO | 0.005–0.015 | | |

* * * * *